（12） United States Patent
Dias de Assuncao et al.

(10) Patent No.: US 9,298,443 B2
(45) Date of Patent: Mar. 29, 2016

(54) SYSTEM AND METHOD FOR DETERMINING WHEN CLOUD VIRTUAL MACHINES NEED TO BE UPDATED

(71) Applicant: International Business Machines Corporation, Armonk, NY (US)

(72) Inventors: Marcos Dias de Assuncao, Sao Paulo (BR); Marco Aurelio Stelmar Netto, Sao Paulo (BR); Lakshminarayanan Renganarayana, Elmsford, NY (US); Christopher C. Young, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 13/767,102

(22) Filed: Feb. 14, 2013

(65) Prior Publication Data

US 2014/0229939 A1   Aug. 14, 2014

(51) Int. Cl.
G06F 9/445   (2006.01)
G06F 9/455   (2006.01)

(52) U.S. Cl.
CPC .. *G06F 8/63* (2013.01); *G06F 8/65* (2013.01); *G06F 9/45533* (2013.01)

(58) Field of Classification Search
None
See application file for complete search history.

(56) References Cited

U.S. PATENT DOCUMENTS

| 6,477,703 | B1 | 11/2002 | Smith et al. |
| 7,840,957 | B2 | 11/2010 | Kumashiro et al. |
| 7,975,264 | B2 | 7/2011 | Sriram, I et al. |
| 8,176,483 | B2 | 5/2012 | Hoefler et al. |
| 2004/0139128 | A1* | 7/2004 | Becker et al. ................. 707/204 |
| 2006/0080656 | A1 | 4/2006 | Cain et al. |
| 2006/0190417 | A1* | 8/2006 | Hilkemeyer ....... G06Q 30/0206 705/400 |
| 2007/0169089 | A1 | 7/2007 | Bantz et al. |
| 2007/0192763 | A1 | 8/2007 | Helvick |
| 2008/0201702 | A1 | 8/2008 | Bunn |
| 2009/0222811 | A1 | 9/2009 | Faus et al. |
| 2010/0257517 | A1 | 10/2010 | Sriram et al. |
| 2011/0321031 | A1* | 12/2011 | Dournov et al. ............... 717/171 |
| 2012/0066762 | A1* | 3/2012 | Todorovic ........................ 726/22 |
| 2012/0084445 | A1* | 4/2012 | Brock et al. .................. 709/226 |
| 2013/0297921 | A1* | 11/2013 | Wright et al. ..................... 713/2 |

* cited by examiner

*Primary Examiner* — Emerson Puente
*Assistant Examiner* — Jonathan R Labud
(74) *Attorney, Agent, or Firm* — Louis J. Percello, Esq.; McGinn IP Law Group, PLLC

(57) ABSTRACT

A method (and structure) for providing a computing infrastructure based on virtual machines. A virtual machine provisioning system, as executed by a processor on a network, receives a virtual machine request, as an input; retrieves a virtual machine image from a library of virtual machine images, to accommodate the virtual machine request; constructs an instantiated virtual machine from the selected virtual machine image by provisioning the selected virtual machine image to accommodate the virtual machine request; and outputs the instantiated virtual machine. An image update system determines an update timing for updating at least one of the virtual machine image and the virtual machine as instantiated, based on update costs.

13 Claims, 10 Drawing Sheets

SYSTEM AND METHOD FOR DETERMINING WHEN CLOUD VIRTUAL MACHINES NEED TO BE UPDATED

BACKGROUND OF THE INVENTION

1. Field of the Invention

The present invention generally relates to updating virtual machines, as provided by cloud providers. More specifically, a mechanism for decisions on virtual machine service updates is provided, including such determinations as whether to update a virtual machine instance or to update the underlying virtual machine image used for instantiations of the virtual machine.

2. Description of the Related Art

It is common practice for cloud providers to publish a set of virtual machine images which consumers can instantiate as a specific virtual machine instance on the cloud, resulting in a simplified experience and shorter time to value. These images are a combination of virtual resources, an operating system, and potentially one or more software products. The provider must determine the optimal set of images to offer and must continually evaluate when updates are required. Updates typically come in the form of patches and either correct bugs or security vulnerabilities or introduce new functionality.

However, as will be explained, the complexity and effort required to apply patches to a virtual machine image is much higher than that required to patch a virtual machine instance. This is attributable to the risk of incorrectly modifying configurations, breaking the cloud provisioning for the image, or preventing the correct operation of a management stack.

If a patch is not applied to an image, it must then be applied to each instance of that image, either during the stage of instantiation or subsequent to the instantiation. This process results in the consumption of compute resources and the customer potentially receiving an initial instance which has not been tested by the cloud provider.

Thus, the present inventors have recognized a new problem in the field of cloud provisioning, in that there are choices to be made for cloud providers relative to virtual machine updating, including even the choice of whether to update the underlying virtual machine images or to update the virtual machine instances. Other updating decisions involve determining optimal timing for such updates, given that updates are constantly being received by cloud providers from software suppliers.

SUMMARY OF THE INVENTION

In view of the foregoing, and other, exemplary problems, drawbacks, and disadvantages of the conventional systems, it is an exemplary feature of the present invention to provide a structure (and method) for making virtual machine update decisions, as based on costs associated with updating.

It is another exemplary feature of the present invention to provide a method in which it can be determined whether it would be less costly to update an underlying virtual machine image rather than update each virtual machine instance.

It is another exemplary feature of the present invention to provide a mechanism to cloud providers for calculating a maximum update time for virtual machine images.

It is yet another exemplary feature of the present invention to provide a mechanism to cloud providers for determining whether an image or instance needs to be updated immediately, as based only upon currently-pending patches.

In a first exemplary aspect, described herein is a method of providing a computing infrastructure based on virtual machines, including providing a virtual machine provisioning system, as executed by a processor on a network. The virtual machine provisioning system receives a virtual machine request, as an input; retrieves a virtual machine image from a library of virtual machine images, to accommodate the virtual machine request; constructs an instantiated virtual machine from the selected virtual machine image by provisioning the selected virtual machine image, to accommodate the virtual machine request and by at least one of removing and installing software systems, to accommodate the virtual machine request; and outputs the instantiated virtual machine in response to the input virtual machine request. An image update system determines an update timing for updating at least one of the virtual machine image and the virtual machine as instantiated, based on update costs.

In a second exemplary aspect, also described herein is a system including at least one processor and a storage device to store a program of instructions permitting one of the at least one processor to implement and execute an image update method for determining an update timing for updating at least one of a virtual machine image and a virtual machine as instantiated from the virtual machine image, as based on update costs.

In a third exemplary aspect, also described herein is a non-transitory, computer-readable, storage medium tangibly embodying a program of machine-readable instructions executable by a digital processing apparatus to perform a method of implementing and executing an image update method for determining an update timing for updating at least one of a virtual machine image and a virtual machine as instantiated from the virtual machine image, as based on update costs.

BRIEF DESCRIPTION OF THE DRAWINGS

The foregoing and other purposes, aspects and advantages will be better understood from the following detailed description of an exemplary embodiment of the invention with reference to the drawings, in which.

DETAILED DESCRIPTION OF EXEMPLARY EMBODIMENTS

Figure 1:
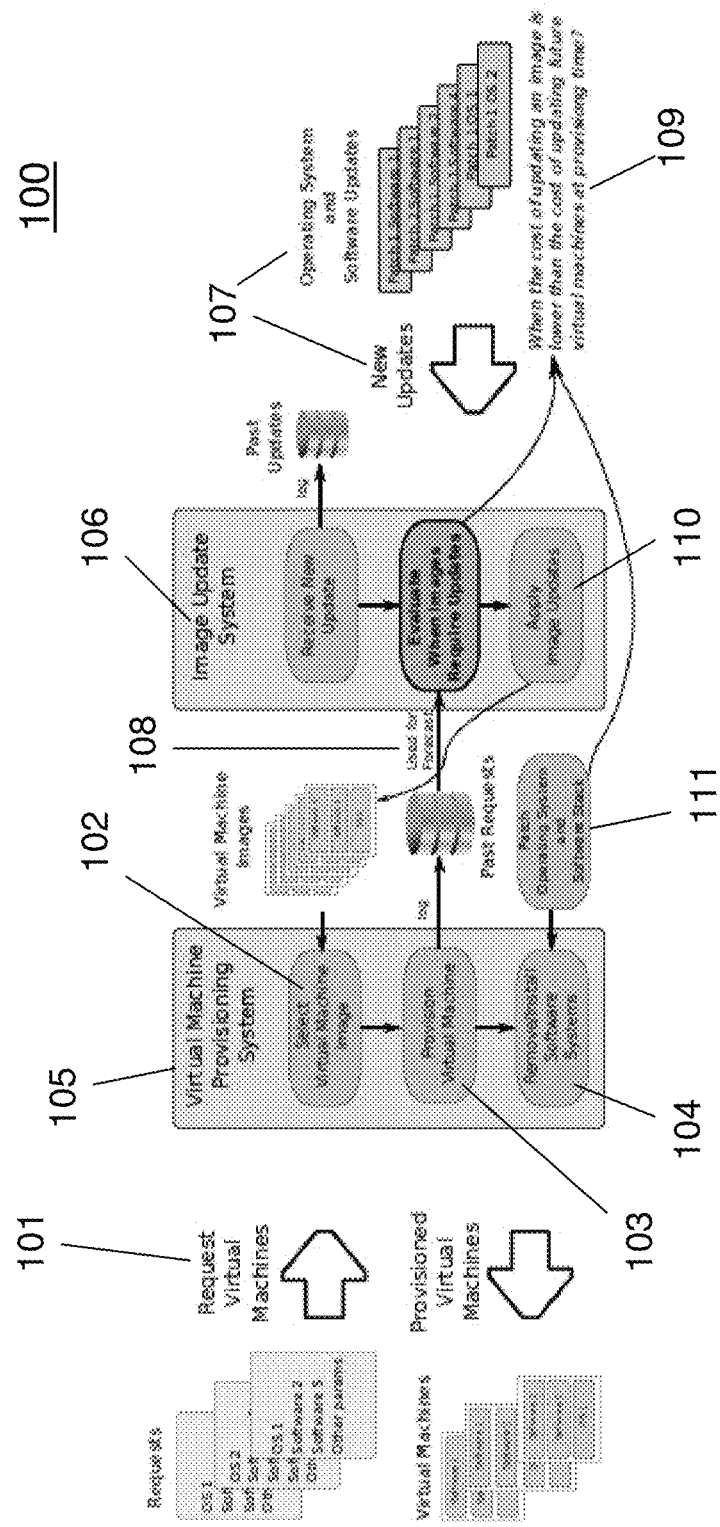
FIG. 1 shows an exemplary flow diagram 100 of an exemplary embodiment of the present invention.

Referring now to the drawings, and more particularly to FIGS. 1-10, exemplary embodiments of the method and structures according to the present invention will now be described.

In an effort to reduce information technology (IT) capital and operational expenditures, organizations of all sizes are moving their application workloads to the cloud. Clouds vary significantly in their specific technologies and implementation, but all share virtualization as a fundamental underpinning. Virtualization provides clouds with the ability to host multiple distinct and independent operating system runtimes within a single hardware unit. This feature, along with robust interfaces (programmatic and/or graphical), permits cloud consumers the freedom to dynamically create and destroy virtual machine instances in the cloud, known as "cloud instances".

Clouds provide compute resources as a service in several models, including infrastructure, platform, and software. The base model is known as Infrastructure as a Service (IaaS) and provides cloud consumers with operating system instances on which they are able to host their middleware and applications. With IaaS, the cloud provider typically offers a set of generic starter images which provide an effective base for further customization specific to a consumers' workload. Cloud consumers may also have the option to leverage community-constructed images or to construct their own custom image. The cloud consumers' goal is to find an image which most closely matches the requirements of their workload and therefore reduces manual effort associated with further tailoring.

The management and governance of images become complicated, since each individual customer introduces their own unique requirements. The currency of software within an image provides a challenging problem for both the cloud provider and cloud consumer. Neither party, the cloud consumer nor the cloud service provider, benefits from outdated or insecure software versions, and therefore, the present inventors have realized that a method is needed to aid these parties in determining the most appropriate frequency and method to apply software patches. The present invention addresses this challenge, for the benefit of both the cloud provider and consumers.

To state the present problem more precisely, once a cloud's image library has been established, the image owners must continuously monitor the availability of relevant patches and determine which images should be updated and with what degree of urgency. This activity is necessary to apply the latest bug, feature, and security patches across the operating system and software stack. The present inventors have recognized that the decision of when to patch an image is not trivial as the additional complexity and time required to patch an image must be balanced against that of updating future instances derived from that image.

Thus, the present invention can be considered as providing a solution to a newly-recognized problem directed to updates for cloud service providers. In one aspect, the present invention addresses the question of whether to update instances of a virtual machine versus updating the virtual machine image underlying instantiated virtual machines. Additionally, the present invention can be used to determine maximum time to provide the next update and to determine whether an image should be updated immediately, based upon current pending patches.

The present invention provides various algorithms that assist the parties responsible for image currency to determine which images should be updated with software patches at a point in time. The algorithms described herein consider several aspects of cost involved with updating an image or dynamically updating each instance at instantiation time. The algorithms can be evaluated against historic request data from a production data centre.

These algorithms can be used to identify when an image should be updated based on the frequency of instantiation requests and the outstanding patches as actually experienced in a production data centre. Testing results establish that the prediction of image instantiation requests is crucial to determining the length of time that images can remain un-patched while considering resource cost, risk of a bad patch, and cost of patching all subsequent instances.

Challenges with Updating Images

To begin with and as is well understood in the art, a cloud is constructed by providing a layer management atop a number of hosting resources which are able to respond quickly and dynamically to the cloud management's requests. Virtualization is the industry standard technology which permits the most effective partitioning of the backing physical hosting resources.

A virtual machine (VM) is a logical partition of a virtualized host. Within the context of cloud, a VM is known as a "cloud instance", or "instance", for short, in the following discussion. Instances provide the basic building block for an organization's application infrastructure. As with a traditional data centre, the various higher-level software systems (e.g., agents, middleware, and applications) have specific requirements that drive the need for a variety of instance configurations from a resource (e.g., CPU, memory, disk) and software perspective (e.g., OS type, version, configuration, middleware).

Thus, for purpose of presenting concepts of the present invention, a cloud can be considered as computing infrastructure based on virtual machines, and a cloud service would be the method or the entity that makes such computing infrastructure available to consumers via a network such as the Internet.

A common virtualization practice is to persist these combinations of resources and software into a reusable package known as an "image". Thus, an image is able to be used repeatedly as the basis for new instances and results in improved provisioning performance as well as increased consistency in the resulting instance configuration. The accessibility, variety, and quality of image availability for selection within a cloud offer a key differentiator for the cloud provider and an increased attractiveness for the cloud consumer.

One such example is the active community which Amazon has created within its "un-managed" IaaS Elastic Compute Cloud (EC2), where individuals, third party vendors, and Amazon itself contribute Amazon Machine Images (AMI) for consumption by all EC2 consumers. Cloud consumers are free to search the AMI library and select an image that best matches their application's requirements.

Active image management is required to mitigate complexities and ensure the cloud provider and consumer to receive maximum benefits from images. For example, one primary complexity which will be described is the need to balance the cost of applying patches (e.g, for bugs, security, features) to an image versus the cost of dynamically applying the patches during the provisioning of each new instance.

Since other update issues and options will also be discussed, the present invention should be viewed as a mechanism that generally provides virtual machine updates to be implemented by cloud providers in a manner that considers various update costs.

A. Images and Managed Vs. Un-Managed Clouds

Another layer of cloud differentiation comes in the form of a managed or un-managed cloud service. An un-managed cloud service provides the base infrastructure and relies on the consumer to perform all day-to-day management activities for their instance. In a managed cloud service, the provider goes beyond the instance-hypervisor barrier and offers traditional services such as performance monitoring, availability monitoring, license management, and patch management. The managed service level imposes additional conditions and constraints on the instance which must be met in order to continue to receive the benefit. For example, if a cloud consumer were to uninstall the monitoring agent they would very likely void their service level agreement.

The instantiation of images in a managed cloud model is typically much more complex than that of an un-managed cloud. The additional agents and security policies that are imposed by the managed cloud must be implemented by the completion of provisioning and the subsequent release of the instance to the consumer. These items are typically spread across the image and the code which is used to create an instance. For example, the operating system security settings could be captured in a managed cloud compliant image and the installation of the monitoring agent and registration with the monitoring infrastructure could be completed at provisioning time via code. From a patching perspective, it is obvious that both the functionality of the management agents and the code responsible to instantiate an image would be sensitive to any changes introduced by patches.

FIG. 1 depicts a common scenario 100 where an application owner defines the configurations required to support his/her specific application (the result is a request 101). A cloud image 102 must then be selected to act as the basis for the request, taking into consideration the operating system as well as any additional software components or configurations required. The selected image is then instantiated 103 and dynamic modifications are performed 104 to install missing software or uninstall unnecessary software (e.g., due to license issues).

This is a natural point in the process to apply any outstanding operating system or software patches, since at this point the instance would more closely match the original request and also contain the latest patches. But such updating at the point of instantiation would occur at a cost of time and convenience to the consumer's desire to have the virtual machine instantiated immediately, so that it might be less costly to have updated the underlying image instead of each instantiation.

FIG. 1 shows a virtual machine provisioning system 105 that permits the virtual machines to be requested and instantiated by clients. FIG. 1 also depicts another important component of the cloud provider infrastructure which is the Image Update System 106 provided and used as a component of the present invention. This component 106 is responsible for receiving information 107 from software maintainers about which patch has been released and what the patch is for. This information, along with a forecast 108 of future instance requests and the various algorithms described herein, enables the cloud provider to determine 109 such update management decisions such as when they are better off to patch the image 110 versus allowing the patches to be installed as the final step of provisioning 111.

This information can guide the cloud and image administrators to define the lowest cost patch schedule by considering the cost of patching each instance versus the cost to patch an image, as one aspect of managing virtual machine updates. Clearly, as the number of patches accumulates, the installation time and the risk of breaking the compliance of the image or management agents increases. The following section discusses some of the major differences in the challenges associated with updating an image versus an instance.

B. Differences of Updating Instances and Images

The process of applying a patch to an operating system or piece of software requires the patch to be fetched from the provider, the evaluation of relevancy and dependencies, and finally the application of the patch to modify the existing installed files. A reboot may be required to activate and validate the change introduced by the patch.

At this point, it is noted that updating of either instances or images could be either completely automatic or could involve manual inputs from an administrator, depending upon the nature of the patches. These characteristics are readily ascertainable upon receipt of software patches. The algorithms described herein inherently consider both automatic and/or manual update aspects in their calculations, as identified by the costs associated with each update.

The exemplary Algorithm 1 below defines typical steps required to update an image, steps that can be quite complicated and time consuming for a single patch. The algorithm considers both offline and online patching techniques. Offline provides the ability to patch a dormant image without instantiating it. Online requires the image to be instantiated and accessible via traditional methods of connectivity.

---

Algorithm 1: Process to update an image:

---

```
Input: patchList
imageList ← cloud.getImpactedImages(patchList)
foreach image in imageList do
    if offline patch required then
        mount image
        apply offline patches
        run unit tests
        unmount image
    if online patch required then
        instantiate the image
        apply online patches
        if reboot required then
            reboot
        run unit tests
    reset / generalize image
    shutdown
    convert to image
    publish to image library
```

---

In a managed cloud environment it is very important that this process is followed to reduce the risk of a faulty image entering the cloud system. Releasing a faulty image cloud causes a number of issues including:

A failure in provisioning due to the image not meeting the requirements of the provisioning code;

A failure in compliance once instantiated;

A failure in one or more management agents, jeopardizing the ability of the provider to uphold the service level; and A consumer receives a non-functioning instance.

The process to update an instance is outlined in an exemplary Algorithm 2 provided below. This process is similar to that for an image, but shifts the risk mitigation from the cloud provider to the consumer and ultimately the application owner. When dealing with initial provisioning, the cloud consumer is primarily focused on quickly getting their instance so they can begin to deploy their application. This process contrasts patching an instance that is already running an application where clearly the concern is to ensure that the application continues to behave as expected and that there are no unplanned disruptions to the end users. Along this line, the cloud provider could even provide a mechanism that solicits permission from the end user to perform an update, either prior to the initial instantiation or to disrupt an already-deployed instantiation, thereby providing the end user a degree of control of the availability and update state of the instantiated virtual machine.

---
Algorithm 2: Process to update an instance:
---

```
Input: patchList
instanceList ← cloud.getImpactedInstances(patchList)
foreach instance in instanceList do
    if instance is offline then
        bring instance online
    apply online patches
    if reboot required then
        reboot
    if instance was offline then
        bring instance offline
    performance instance smoke test
    notify instance owner of patch results
```

The ramifications of failing to properly apply a patch in both scenarios is severe, however, the cost of applying the patch from a cloud provider's perspective is seen as much higher in the image case versus the instance case. The next section provides an overview of the frequency of patches across operating system and software to give a better sense of the complexity of the issue.

C. Examples of Patch Release Characteristics

The distributions and characteristics of patches vary between types of software (e.g., operating systems, middleware) and across vendors (e.g., those seen as enterprise mission critical versus hobby open source). The very nature of some software, in terms of frequency of installation or location within an application topology, makes them much more likely to have the need for patches discovered. Some products are on fixed schedules where patches are accumulated and applied in larger aggregate patches (e.g., fix packs for IBM DB2).

Other patches, like those for Linux distributions, are released frequently due to the community driven nature of Linux, the large number of packages in a distribution, and the robustness of distribution via public package management. Table I below provides a summary of patch statistics for five releases of the OpenSuSE operating system. The entry Patches/Month describes the total patches per month per operating system release.

TABLE I

SUMMARY PATCH STATISTICS FOR OPENSUSE RELEASES 11.1, 11.2, 11.3, 11.4, 12.1.

| Category | Avg. | Max | Median |
|---|---|---|---|
| Packages/Release | 1256 | 1394 | 1245 |
| Patches/Release | 6256 | 9329 | 5842 |
| Patches/Package | 3 | 219 | 5 |
| Patches/Month | 475 | 541 | 348 |
| Size/Patch (KB) | 1,598 | 114,688 | 67 |

Figure 2:
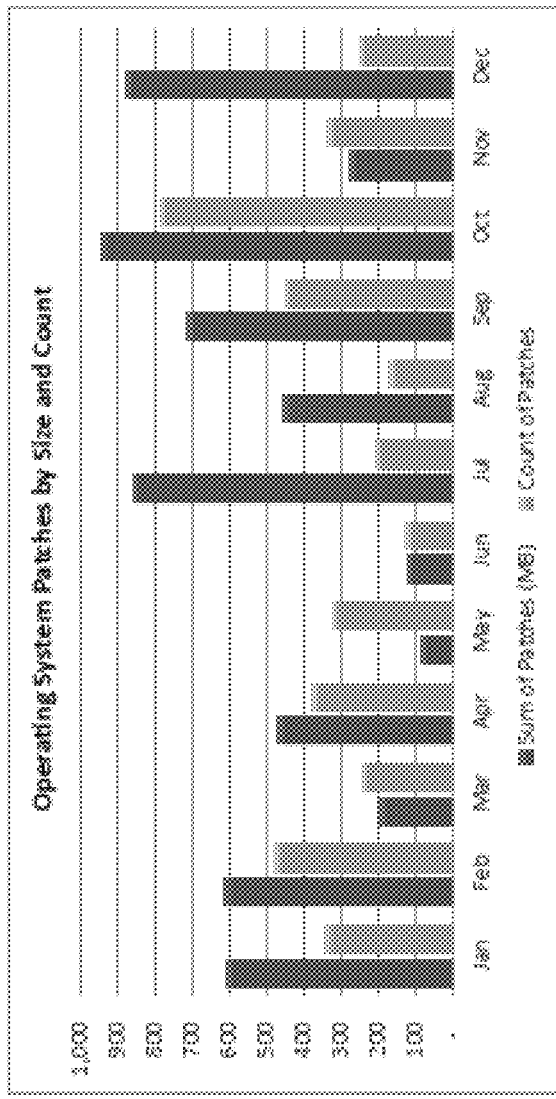
FIG. 2 shows exemplary data 200 for size and count of patches released for the OpenSuSE 11.1 operating system in 2010.

FIG. 2 shows exemplary data 200 that highlights the fluctuation in patch arrival time as well as the total size of the patches included in the time period. When the data is examined more broadly, there is an average of 323 patches released each month with the most popular culprit being java, which saw an average of 219 patches over the lifespan of the release. The patch sizes themselves vary greatly with a median size of 67 KB but a maximum size of 115 MB. As a simple exercise it is possible to see from this graph that delaying image updates to once a month (fixed schedule) would result in the potential for hundreds of MBs of patches to be applied during instantiation.

Figure 3:
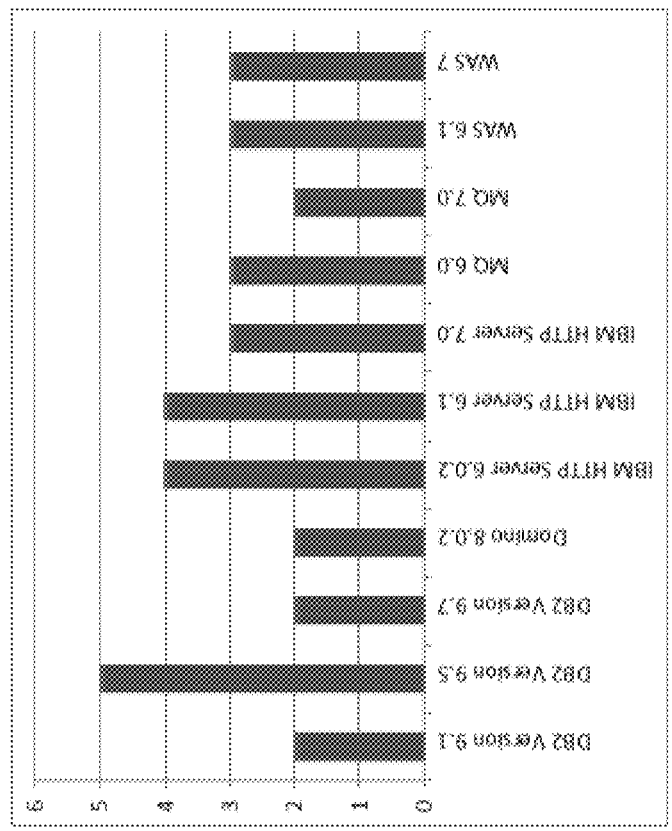
FIG. 3 shows exemplary data 300 for select IBM middleware fixpacks released in 2008.

FIG. 3 shows exemplary data 300 for the patch frequency by major release for larger middleware software including an application server (IBM WebSphere Application Server) and a database server (IBM DB2). Middleware products obviously display a different pattern from the underlying operating system but are similar in release frequency for the median operating system package. In general, based on the analysis of 15 products from IBM, the present inventors observed that on average there is one patch released every five months, with the most frequent releases being once every 2.5 months. The number of patches per release also varies based on the lifespan of the product with the maximum witnessed being 23 (over 7 years).

Finally, a general observation is that middleware patches are significantly larger than the operating system packages, with the average size being well into the 100s of MB. The predictability of patches is also much better when a vendor (e.g., IBM) publishes in advance the expected date for the next fix pack to be released. One key differentiator here is that a software fix pack generally contains many individual patches whereas the operating system patches are on a per individual component basis.

Image Updating Algorithms

As described in the previous section, the process and costs associated with updating an instance versus an image are quite different. These two aspects are included in this exemplary algorithm to determine when images should be updated.

---
Algorithm 3: Pseudo-code for determining the maximum time for updating an image:
---

```
Input: reqList, patchList, image
Output: maximumUpdateTime
1  iPatchList ← patchList.getPatches(image)
2  patchICost ← iPatchList.getImageCost(image)
3  patchRCost ← iPatchList.getReqCost(image)
4  nReqs ← 0
5  maximumUpdateTime ← 0
6  foreach time unit t do
7      maximumUpdateTime ← maximumUpdateTime + t
8      nReqs ← nReqs + reqList.getFutureReqs(image, t)
9      if patchICost < nFutureReqs * patchRCost * k then
10         return maximumUpdateTime
11 return -1
```

Exemplary Algorithm 3 above represents the pseudo-code for determining the maximum update time when a set of updates need to be applied onto an image. The algorithm can be executed at fixed time intervals or dynamically upon the management system receiving a new patch. This alleviates the necessity to attempt to predict the arrival times of future patches. The algorithm has the following input variables:

reqList: previous requests for provisioning instances. Each request contains the required operating system, software stack, and additional configuration parameters;
    patchList: description and links to download and apply operating system and software updates;
    image: image to be evaluated.

The algorithm starts by initialising iPatchList (Line 1), which includes the patches from patchList that are deemed relevant for the image. After that, the two update costs are set (Lines 2-3): patchTCost and patchRCost which represent the cost of applying the patches iPatchList into the image and into an instance provisioned from that image.

A cloud provider can readily obtain estimates for the costs of applying patches, as used in Algorithm 3, by noting that Algorithm 1 and Algorithm 2 above provide steps typically used for applying patches. Therefore, a cloud provider can readily use historical data on previous updates for images and instances as based on that cloud providers own operations and procedures, to develop cost estimates for any patches upon receipt, as based on the patch size or other relevant parameters such as complexity, etc.

Then, in Algorithm 3, a loop is used to compare the image and instance update costs according to the advancement of time (Lines 6-10). Such time t can be hours, days, weeks, and so on. The number of future requests nReqs is updated for each loop iteration (Line 8).

Then a test is executed to determine if the cost for updating an image is lower than the cost of updating all future instances from that image (Line 9). If the cost is lower then return the maximum update time (Line 10). A k factor is used to compensate for the fact that the cost may vary for each instance provisioned (Line 9). It is noted that this factor k would also be available through historical data on updates and provides a parameter potentially unique to each cloud service provider.

It is important to note that Algorithm 3 considers the evaluation of a single image. However, a likely scenario would be a system administrator who wants to know the maximum update time for a set of images. For this scenario, two extra variables for storing the total cost of updating all images and the total cost for updating all instances could be compared, and when the first was lower than the second, the maximum update time is returned.

Additionally, it is noted that the calculation for Algorithm 3 could be implemented to occur automatically for the cloud service provider. For example, the Image Update System 105 exemplarily shown in FIG. 1 could be configured to constantly update this calculation, as new updates are received, and make such updated calculations available to the cloud service provider administrators and/or automatically perform appropriate updating.

Additionally, a system administrator might be interested in determining whether an instance should be updated immediately. Algorithm 4 below provides such answer and is a variation of Algorithm 3. In this variation, Algorithm 4 can be executed at predetermined time intervals or automatically whenever a new patch arrives.

---

Algorithm 4: Pseudo-code for determining
whether an image needs to be updated
immediately, considering only pending patches:

Input: reqList, patchList, image, timeInFuture
Output: UpdateNow (Boolean)
1 iPatchList ← patchList.getPatches(image)
2 patchICost ← iPatchList.getImageCost(image)
3 patchRCost ← iPatchList.getReqCost(image)
4 nFutureReqs ← reqList.getFutReqs (image, timeInFuture)
5 if patchICost < nFutureReqs * patchRCost * k then
6    return true
7 return false

---

Algorithm 4 differs in several respects from Algorithm 3. For example, Algorithm 3 evaluates patches within a time horizon in the future, which can be beneficial for planning purposes. Algorithm 4 looks at the current time, which can be used in cases that administrators suspect that a prediction generated by Algorithm 3 may not be precise. Thus, Algorithm 4 can serve as a confirmation mechanism for Algorithm 3. Additionally, as noted above, Algorithm 4 could be automatically executed upon receipt of any new patches, thereby potentially setting up an immediate update, whether automatic or manual.

It should be clear to one having ordinary skill in the art that the rationale behind the image updating algorithm is that, by predicting requests and using information on the costs associated with updating an image or an instance, it is possible to determine when an image should to be updated. This knowledge reduces the time associated with applying patches to the image and the impact on future instances based on the image.

In a paper to be published shortly describing aspects of the present invention, experimental results are presented that demonstrate that the principle is sound. The contents of this paper are incorporated herein by reference.

However, without getting into the details of the discussion in this paper concerning the setup and theory of the experimental results, a number of benefits and additional aspects resulting from the present invention can be recognized from these experimental results, based on calculation of wasted time percentages. Table II below shows a summary of experimental parameters and values for this evaluation. The arrival times of requests is presumed to follow a Zipf distribution.

TABLE II

SUMMARY OF EXPERIMENT PARAMETERS AND VALUES.

| Parameter | Value | Description |
| --- | --- | --- |
| ReqArrival | Zipf (1.5) | Request arrival time |
| VMPatchTime | Normal (50, 30) | VM Patch time (secs) |
| ImgPatchTime | Normal (100, 30) | Image Patch time (secs) |
| BreakRisk | 0.05-0.5% | Probability of image break |
| PredAccOver | 0-300% | Pred. accuracy overest. |
| PredAccUnder | 0-99% | Pred. accuracy underest. |

As an example, a first analysis considers the accuracy of the prediction for future requests. This is a key parameter as accuracy of the predictions is highly dependent on the data centre and its workload. In this evaluation, the present inventors analyzed both overestimation and underestimation of the number of future requests.

Overestimation of Future Requests.

Figure 4:
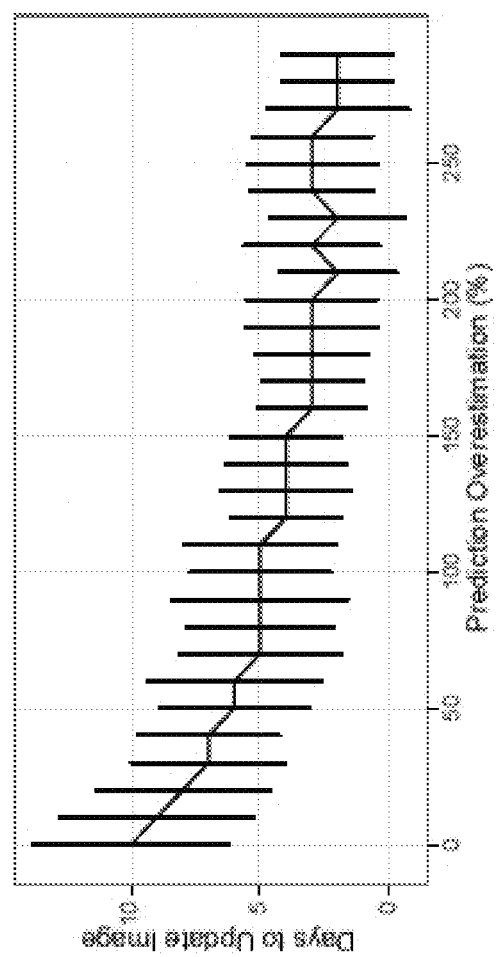
FIG. 4 shows exemplary testing results 400 that indicate the average number of days in the future when an image is updated as a function of an overestimated number of requests that will use the image.

This is a scenario of cautious management, where the value of the future number of requests is overestimated. The higher the overestimation, the earlier the day an image needs to be updated. This behaviour is illustrated in FIG. 4, which shows the average number of days in the future (including the standard deviation bars) when an image is updated as a function of the overestimated number of requests that will use the image. The number of days in the future when to update the image decreases with the overestimation until it reaches a point where the algorithm determines that the image needs to be updated on the "next day". Hence, with overestimation of requests, even with few requests the image is updated more often.

Figure 5:
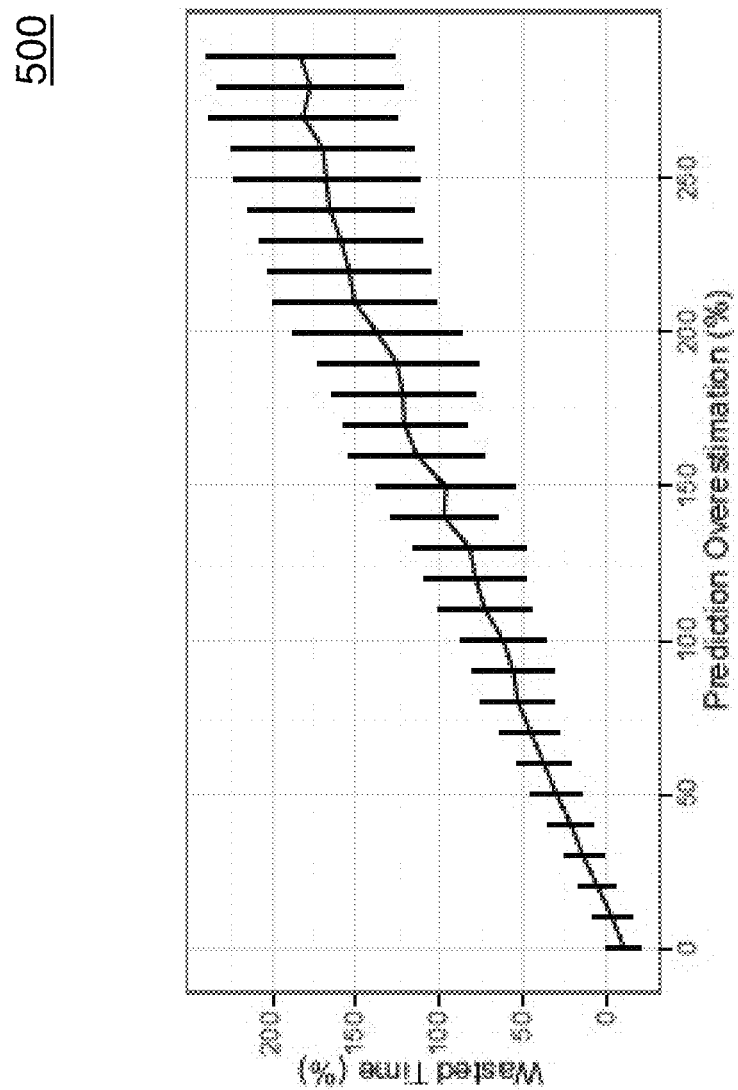
FIG. 5 shows exemplary testing results 500 that indicate the wasted time of updating an image as a function of the underestimated number of requests that will use the image.

The early image update can waste a considerable amount of time and resources, as depicted in FIG. 5. This figure shows the wasted time of updating an image as a function of the underestimated number of requests that will use the image. It can be noted that, when the overestimation is high, similar to the number of days metric, the wasted time reaches a threshold. This can be observed by comparing the standard deviation bars under low and high overestimation. This happens because the number of days in the future when the image needs to be updated stops to reduce, getting closer to the "next day" phenomenon. The results also show a tolerance of approximately 10% for the overestimation to determine the maximum time to update the image.

Underestimation of Future Requests.

Figure 6:
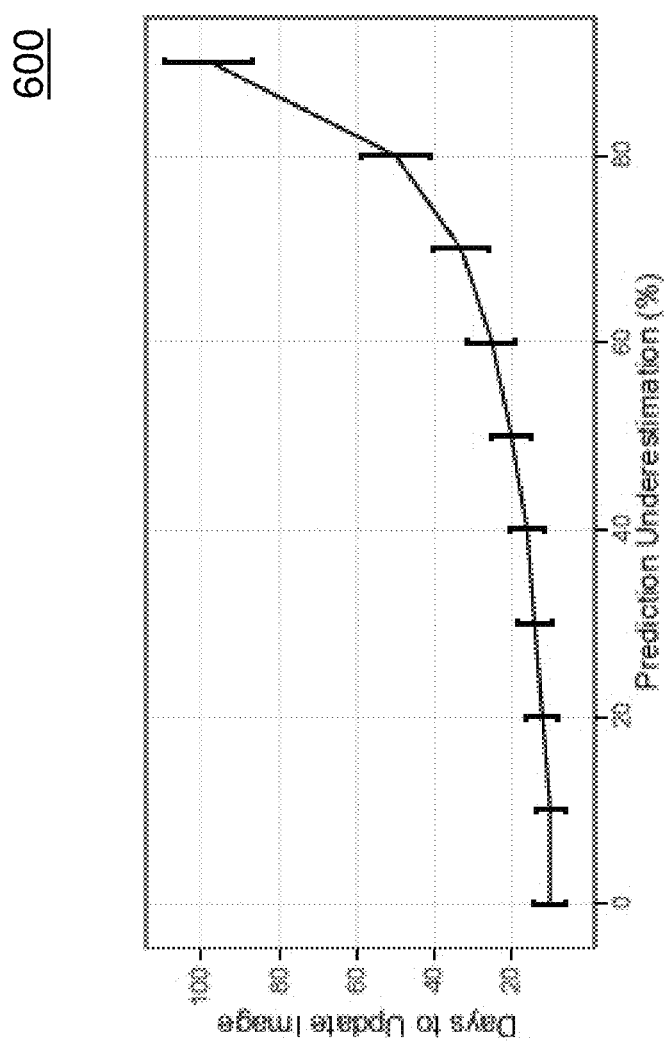
FIG. 6 shows exemplary testing results 600 that indicate why administrators may prefer to set a predetermined threshold number of days for updating.

This is a scenario of more relaxed management, where the number of future number of requests is underestimated. In this case, the higher the underestimation, the later an image is updated. This behaviour is illustrated in FIG. 6, where it shows the number of days in the future when an image is updated as a function of the underestimated number of requests that will use the image.

The difference from the overestimation scenario can be noted. Here, the underestimation was varied only up to 99%, since the value of 100% represents that there will be no future requests. Underestimation has a key difference of overestimation in that, depending on the quality of the request arrival prediction, the algorithm may determine that it will take months until the update is necessary. That is, the impact on the number of days is very high, as can be observed in the curve shown in FIG. 6. Depending on the scenario, this may be acceptable, but system administrators may consider including a threshold for the days to update the image, since actual update arrival data over time can be analyzed to determine whether unacceptable update periods are occurring.

Figure 7:
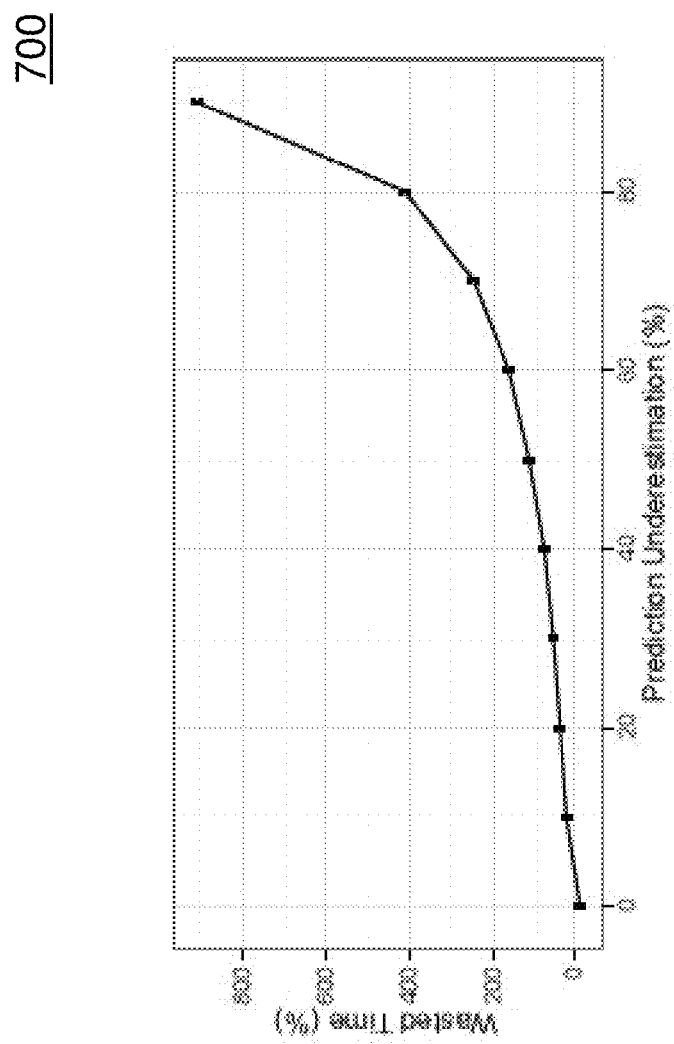
FIG. 7 shows exemplary testing results 700 that indicate how having long periods when the image is not updated can cause considerable amount of wasted time.

That is, the possibility of having long periods when the image is not updated causes a considerable amount of time to be wasted as depicted in FIG. 7. This figure shows the wasted time of updating instances as a function of the underestimated number of requests that will use such an image. Similar to the number of days metric, the wasted time follows an exponential curve due to incorrect prediction of very small number of requests, which results in many more instances to be updated, instead of only updating the image that will generate such instances. The results also show a tolerance of approximately 5% for the underestimation to determine the maximum time to update the image.

Risk of Performing Bad Patches.

Figure 8:
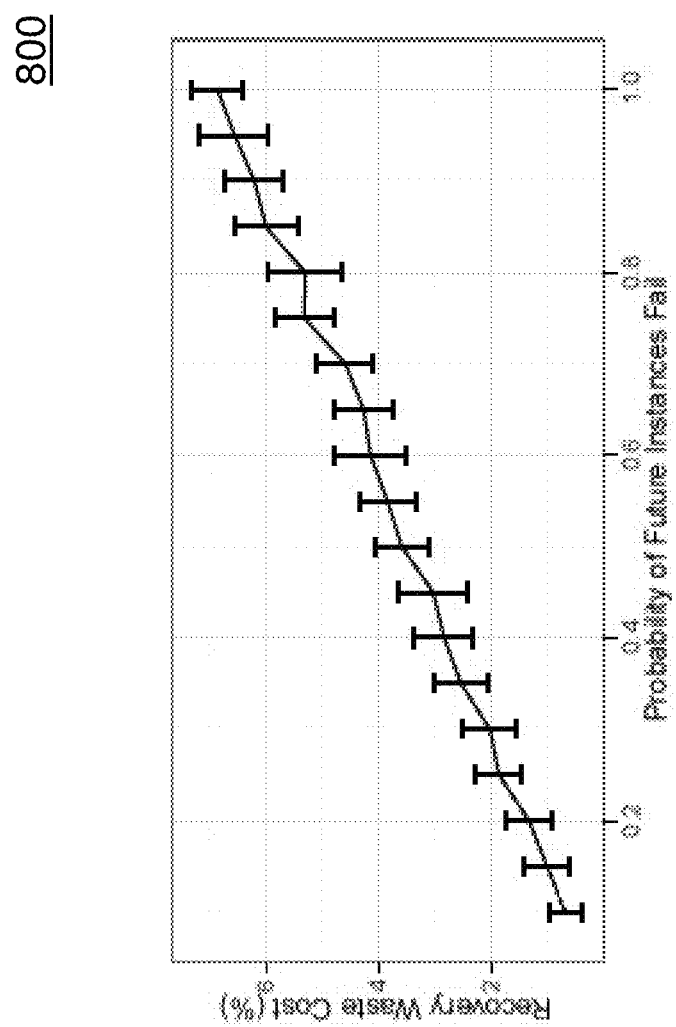
FIG. 8 shows exemplary testing results 800 that indicate impacts of bad patches applied to images on the subsequent provisioning time of instances, by presenting recovery wasted time as a function of image update probability failure.

Another factor that was investigated is the impact of bad patches applied to images on the subsequent provisioning time of instances, FIG. 8 presents the recovery wasted time as a function of image update probability failure. In this evaluation, the probability was varied from 0.5 to 1.0. It can be noted that, when there is a high risk of an image update to compromise future instances, the time to recover those instances may be considerably high. The results presented here were obtained considering one day to detect the error on an instance due to a bad patch on the image. The recovery wasted time may be higher and more costly if the time to detect a problem is long and the instances need to be recreated.

Along these lines, it is noted that the k factor of Algorithm 3 and Algorithm 4 provides a mechanism for each service provider to adjust and optimize for such parameters as identified during testing of concepts of the present invention, as discussed above.

Exemplary Hardware Implementation

Figure 9:
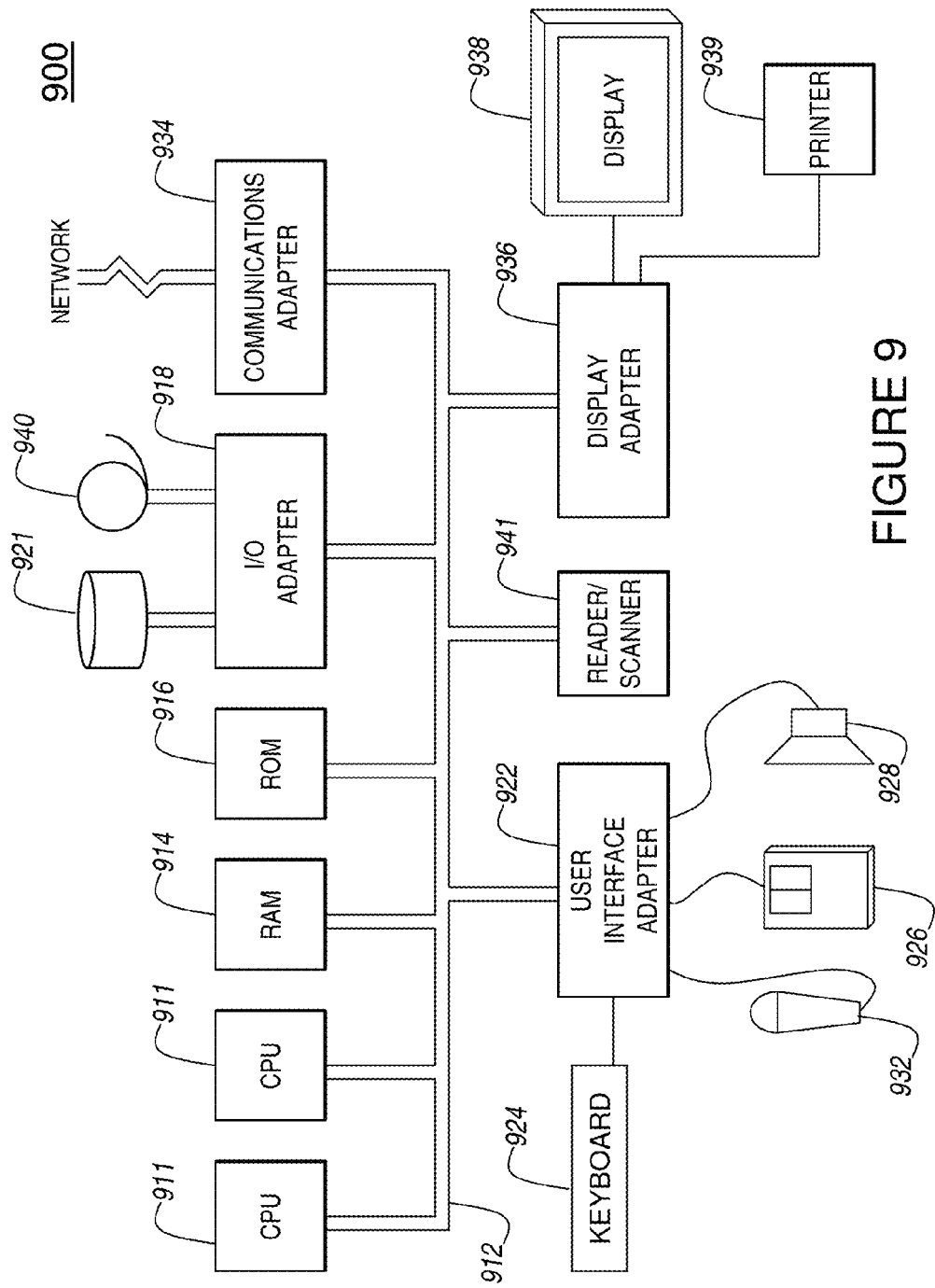
FIG. 9 illustrates an exemplary hardware/information handling system 900 for incorporating the present invention therein.
Figure 10:
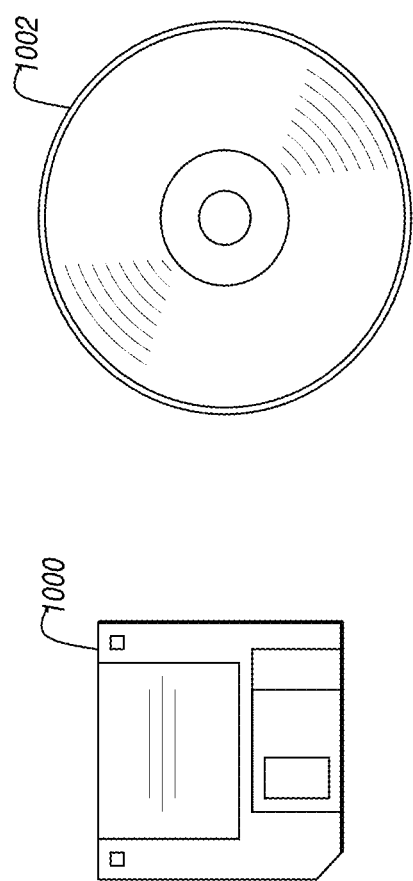
FIG. 10 illustrates a non-transitory, signal-bearing storage medium 1000 (e.g., storage medium) for storing steps of a program for a method according to the present invention.

FIG. 9 illustrates a typical hardware configuration 900 of an information handling/computer system in accordance with the invention and which preferably has at least one processor or central processing unit (CPU) 911.

The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communication adapter 934 for connecting an information handling system to a data processing network, the Internet, an Intranet, a personal area network (PAN), etc., and a display adapter 936 for connecting the bus 912 to a display device 938 and/or printer 939 (e.g., a digital printer or the like). A reader/scanner 941 could also be attached to bus 912.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of non-transitory, signal-bearing storage media, where "signal-bearing" means that instructions are tangibly embedded in a storage medium such that it can be considered that there is a functionality between instructions embedded on the medium and the machine that will execute the instructions.

Thus, this aspect of the present invention is directed to a programmed product, comprising a non-transitory, signal-bearing storage media tangibly embodying a program of machine-readable instructions executable by a digital data processor incorporating the CPU 911 and hardware above, to perform the method of the invention.

This storage media may include, for example, a RAM contained within or associated with the CPU 911, as represented by fast-access storage, for example. Alternatively, the instructions may be contained in another signal-bearing storage media, such as a magnetic data storage diskette 1000 or optical disk 1002 (FIG. 10), directly or indirectly accessible by the CPU 911, which can be considered to be a standalone memory device used to store computer program instructions.

Whether contained in the diskette 1000, 1002, the computer/CPU 911, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media including memory devices in transmission hardware, communication links, and wireless, and including different formats such as digital and analog. In an illustrative embodiment of the invention, the machine-readable instructions may comprise software object code.

In conclusion, it is again noted that images are key components in the cloud, as instances are provisioned based on images that encapsulate the whole software stack required by applications. These images need to be maintained by applying patches regularly in order to, for instance, avoid security vulnerabilities that can compromise a customer's resources and information; or add new software features. The decision of when to patch an image is not trivial as the additional complexity and time required to patch an image must be balanced against that of updating an instance.

The present invention has introduced algorithms to assist the parties responsible for image currency to determine which images should be updated with software patches, and when such updates should occur. The algorithms take into consideration several aspects of cost associated with performing the update to either the image or to an instance during its provisioning process. Based on the evaluation results using data from a production data centre and associated software configurations, the importance of knowing the actual costs involved to update images and instances was identified. As image updates are more costly than instance updates, predicting future requests is fundamental to determine how long the images can remain out-of-date in order save work updating them. However, the wasted cost by performing a bad decision on either updating an image or updating an instance is highly dependent on the prediction of future requests.

The results presented in this invention are representative for the workloads selected to evaluate the image update algorithms. However, also discussed were steps necessary to perform the analysis that can be leveraged by image managers with different settings to perform more effective decisions on when images need to be updated. This is particularly important for managed clouds where customers expect high levels of quality-of-service and quality of images to provision their instances.

While the invention has been described in terms of a single exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of providing a computing infrastructure based on virtual machines, said method comprising:
    providing a virtual machine provisioning system, as executed by a processor on a network, said virtual machine provisioning system:
        receiving a virtual machine request, as an input;
        retrieving a virtual machine image from a library of virtual machine images, to accommodate said virtual machine request;
        constructing an instantiated virtual machine from said selected virtual machine image by provisioning said selected virtual machine image, to accommodate said virtual machine request, and by at least one of removing and installing software systems, to accommodate said virtual machine request; and
        outputting said instantiated virtual machine in response to said input virtual machine request; and
    providing an image update system for determining an optimal timing for updating at least one of said virtual machine image and said virtual machine as instantiated, based on projected update costs,
    wherein said image update system determines a future maximum timing before an update for each said virtual machine image in said library of virtual machine images, said method further comprising:
    providing said future maximum update timing as an output signal, to indicate said future maximum update timing to an administrator of said computing infrastructure;
    receiving and storing an input from said administrator indicating a threshold for days to update said image; and
    using said threshold value for updating said image.

2. The method of claim 1, wherein said updates occur automatically based on said determining an update timing.

3. The method of claim 1, wherein said update timing determination comprises a determination of whether to update a virtual machine image versus to update each virtual machine instantiated from said virtual machine image.

4. The method of claim 3, wherein said image update system makes said determination by evaluating whether a cost of updating said virtual machine image is lower than a cost of updating future virtual machines at provisioning times, based on a prediction of future requests for virtual machines.

5. The method of claim 1, wherein said image update system determines the future maximum update timing for a set of images in said library.

6. The method of claim 1, wherein said image update system determines whether an instantiated virtual machine should be immediately updated, based on only current pending updates.

7. The method of claim 6, wherein said determination for an immediate update occurs upon an arrival of a new update from a software supplier.

8. The method of claim 6, wherein said determination for an immediate update provides a confirmation mechanism for a determination of a future maximum update timing for said virtual machine images.

9. A system, comprising:
    at least one processor; and
    a storage device to store a program of instructions permitting one of said at least one processor to implement and execute an image update method for determining an update timing for updating at least one of a virtual machine image and a virtual machine as instantiated from said virtual machine image, as based on evaluations and comparisons of projected update costs,
    wherein said storage device further stores a program of instructions permitting one of said at least one processor to implement and execute a virtual machine provisioning system, said system further comprising an input port to receive inputs from users on a network for virtual machine requests,
    wherein said virtual machine provisioning system:
        receives a virtual machine request, as an input, through said input port;
        retrieves a virtual machine image from a library of virtual machine images, to accommodate said virtual machine request;
        constructs an instantiated virtual machine from said selected virtual machine image by provisioning said selected virtual machine image, to accommodate said virtual machine request, and by at least one of removing and installing software systems, to accommodate said virtual machine request; and
        outputs said instantiated virtual machine in response to said input virtual machine request,
    wherein said virtual machine provisioning system automatically updates said at least one of a virtual machine image and a virtual machine as instantiated from said virtual machine image in accordance with said determined update timing, and
    wherein said update timing determination comprises at least one of:
        determining whether to update a virtual machine image versus to update each virtual machine instantiated from said virtual machine image;
        determining a future maximum update timing for each said virtual machine image in said library of virtual machine images; and
        determining whether an instantiated virtual machine should be immediately updated, based on only current pending updates.

10. A non-transitory, computer-readable, storage medium tangibly embodying a program of machine-readable instructions executable by a digital processing apparatus to perform a method of implementing and executing an image update method for determining an update timing for updating at least one of a virtual machine image and a virtual machine as instantiated from said virtual machine image, as based on an evaluation of projected update costs, wherein said instructions further permit said digital processing apparatus to implement and execute a virtual machine provisioning system, said system further comprising an input port to receive inputs from users on a network for virtual machine requests, wherein said virtual machine provisioning system:
receives a virtual machine request, as an input, through said input port;
retrieves a virtual machine image from a library of virtual machine images, to accommodate said virtual machine request;
constructs an instantiated virtual machine from said selected virtual machine image by provisioning said selected virtual machine image, to accommodate said virtual machine request, and by at least one of removing and installing software systems, to accommodate said virtual machine request; and
outputs said instantiated virtual machine in response to said input virtual machine request, and wherein said update time determination comprises at least one of:
determining whether to update a virtual machine image versus to update each virtual machine instantiated from said virtual machine image;
determining a future maximum update timing for each said virtual machine image in said library of virtual machine images; and
determining whether an instantiated virtual machine should be immediately updated, based on only current pending updates.

11. The storage medium of claim 10, wherein said virtual machine provisioning system automatically updates said at least one of a virtual machine image and a virtual machine as instantiated from said virtual machine image in accordance with said determined update timing.

12. The storage medium of claim 10, as comprising one of:
a random access memory (RAM) device on a computer, as currently storing a computer program currently being executed by said computer;
a memory device that stores one or more computer programs on said computer that are not currently executing and can be selectively loaded into said RAM device for execution;
a standalone memory device that stores one or more computer programs and that can interface with said computer to download said one or more computer programs onto said computer; and
a memory device associated with a second computer on a network such that said second computer can selectively load said instructions onto a memory device of said computer.

13. The storage medium of claim 10, wherein said image update method for determining said update timing comprises a parameter so that each service provider can adjust and optimize for one or more of an overestimation of future requests, an underestimation of future requests, and a risk of performing bad patches.

* * * * *